UNITED STATES PATENT OFFICE.

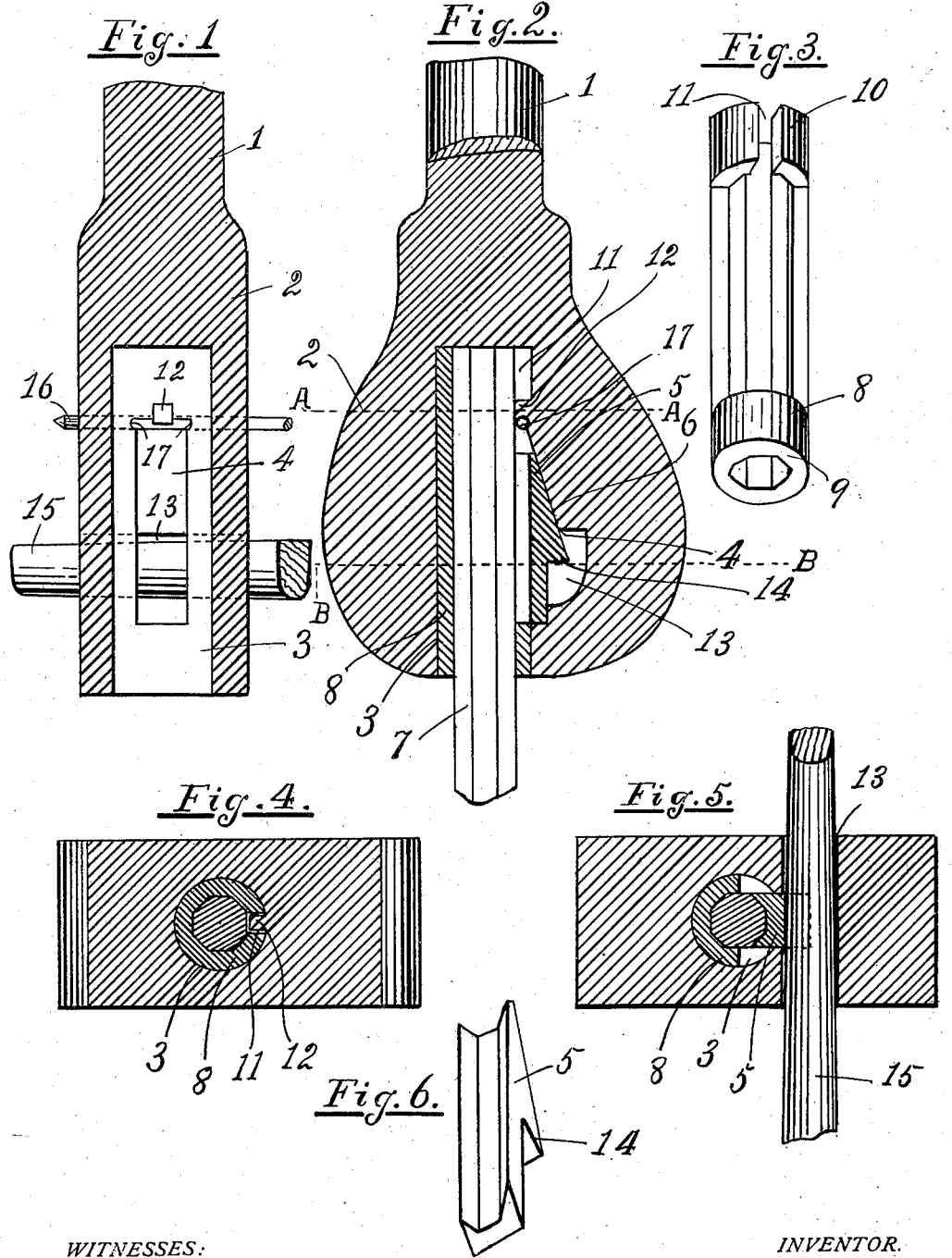

WILLIAM TERRY, OF OAKLAND, CALIFORNIA.

ROCK-DRILL CHUCK.

SPECIFICATION forming part of Letters Patent No. 691,985, dated January 28, 1902.

Application filed April 12, 1901. Serial No. 55,577. (No model.)

*To all whom it may concern:*

Be it known that I, WILLIAM TERRY, a citizen of the United States, residing at 515 Ninth street, Oakland, in the county of Alameda and State of California, have invented certain new and useful Improvements in Rock-Drill Chucks, of which the following is a specification.

My invention relates to improvements in chucks for rock-drills, the object of my invention being to provide means for holding the drill-bit firmly in place in the chuck without the use of U-bolts such as are now generally used. These U-bolts are very expensive, both in original cost and to keep in repair, and are complicated, troublesome, and tedious to operate.

The object of my invention is to provide a simpler form of the device for holding the drill in place.

Referring to the drawings, Figure 1 is a transverse section of the chuck, the drill-bit, the sleeve, and the block being removed therefrom. Fig. 2 is a longitudinal section at right angles to Fig. 1, showing the drill-bit and the sleeve in place, the wedge removed, and the block displaced from contact with the drill-bit. Fig. 3 is a perspective view of the sleeve. Fig. 4 is a transverse section on the line A A of Fig. 2 looking in the direction of the arrow. Fig. 5 is a transverse section on the line B B of Fig. 2, except that the wedge and block are shown in place. Fig. 6 is a perspective view of the block.

Referring to the drawings, 1 represents the piston-rod, and 2 the chuck. Said chuck has formed therein an axial cylindrical socket or cavity 3. The lower side of said socket has, however, an irregular extension, as shown at 4 in Fig. 2, to receive a sliding block 5. Said block 5 has a sloping surface 6, resting upon a corresponding surface in the extension 4; but the block 5 has its upper surface formed to fit close against three of the sides of the octagonal drill-bit 7, and in the upper portion of the socket 3 is placed a shell or sleeve 8, having its outer surface cylindrical to conform to the surface of the socket 3 and its inner surface polyhedral to fit against the sides of the octagonal bit 7. Said sleeve 8 is annular in form at its front or outer end, as shown at 9. In the central portion it is cut away to permit contact with the block 5, and at its rear end it is formed with wings 10, having a channel 11 therebetween, in which channel 11 enters a short ridge or block 12, formed on the lower surface of the cavity 3 to guide the sleeve to its proper position. Through the extension 4 of the socket 3 is an aperture 13, extending entirely through said drill-chuck, into which aperture projects a shoulder 14, formed on the block 5. A wedge or key 15 is passed through said aperture 13 and abuts against the shoulder 14. The effect of forcing the wedge through said aperture transversely to the chuck will be to cause the block 5 to move rearwardly in the socket 3, thereby also by reason of the coengaging faces 6 forcing said block 5 inwardly or toward the axis of the chuck and against the drill-bit, thereby clamping said drill-bit and the sleeve 8 between said block 5 and the inner surface of the chuck. By reason of the double wedging action exerted by the wedge 15 and the block 5 the drill-bit 7 is very firmly held in place.

When it is desired to withdraw the drill-bit, the wedge or key 5 is driven out of the aperture 12, and then the block 5 is forced forward by means of a suitable pointed instrument 16, driven through a small transverse aperture 17 in the rear of the rear end of the block 5. The annular front end of the sleeve 8 forms a solid support for the bit at that point and prevents the same springing.

I claim—

1. The combination of a chuck having an axial socket or cavity for the drill-bit, said socket having a downward extension with a surface sloping upward rearwardly, a shell or sleeve fitting in the socket, and provided with means for guiding the same into position, a block in the lower part of the socket and having a rear upwardly-sloping lower surface to slide on the sloping surface of the extension and act as a wedge, said chuck being also apertured transversely through said extension the block having a shoulder extending into said aperture, and a wedge or key in said transverse aperture engaging said shoulder to shift said block rearwardly and thereby clamp the drill-bit, substantially as described.

2. The combination of a chuck having an axial socket or cavity for the drill-bit, said socket having a downward extension with a surface sloping upward rearwardly, a shell or sleeve fitting in the socket, a block in the lower part of the socket and having a rear upwardly-sloping lower surface to slide on the sloping surface of the extension and act as a wedge, said chuck being also apertured transversely through said extension the block having a shoulder extending into said aperture, and a wedge or key in said transverse aperture engaging said shoulder to shift said block rearwardly and thereby clamp the drill-bit, the chuck being also apertured transversely in the rear of the rear end of the block whereby a suitable pointed instrument may be inserted to remove or loosen the same; substantially as described.

In witness whereof I have hereunto set my hand in the presence of two subscribing witnesses.

WILLIAM TERRY.

Witnesses:
FRANCIS M. WRIGHT,
WALLIS D. McPHERSON.